Dec. 6, 1938.  R. E. HANSON ET AL  2,139,633
ART OF SYNCHRONIZING RIBBON SPEEDS AND OF PRODUCING COMPOSITE RIBBONS
Filed May 27, 1937   3 Sheets-Sheet 1

INVENTORS
J. O. Frostad
BY R. E. Hanson
Morsell, Lieber & Morsell
ATTORNEYS

Dec. 6, 1938.    R. E. HANSON ET AL    2,139,633
ART OF SYNCHRONIZING RIBBON SPEEDS AND OF PRODUCING COMPOSITE RIBBONS
Filed May 27, 1937    3 Sheets-Sheet 2

INVENTORS
J. O. Frostad
R. E. Hanson
BY Morsell, Lieber & Morsell
ATTORNEYS.

Dec. 6, 1938.  R. E. HANSON ET AL  2,139,633
ART OF SYNCHRONIZING RIBBON SPEEDS AND OF PRODUCING COMPOSITE RIBBONS
Filed May 27, 1937  3 Sheets-Sheet 3

INVENTORS
J. O. Frostad
R. E. Hanson
BY Morsell, Lieber & Morsell
ATTORNEYS

Patented Dec. 6, 1938

2,139,633

UNITED STATES PATENT OFFICE 2,139,633

ART OF SYNCHRONIZING RIBBON SPEEDS AND OF PRODUCING COMPOSITE RIBBONS

Roy E. Hanson, Wauwatosa, and George O. Frostad, Milwaukee, Wis., assignors to Milprint Products Corporation, Milwaukee, Wis., a corporation of Delaware Application May 27, 1937, Serial No. 144,992

15 Claims. (Cl. 164—65)

Our present invention relates generally to improvements in the art of handling ribbon-like stock in the manufacture of composite sheets such as commodity wrappers, and relates more specifically to an improved method of and apparatus for synchronizing the speed of travel of several independent but simultaneously longitudinally advancing ribbons, and for properly positioning the same preparatory to joining the adjacent edges thereof.

Generally defined, an object of our present invention is to provide improvements in the art of synchronizing the speed of travel of simultaneously longitudinally advancing ribbons so that the adjacent edges thereof may be effectively joined during their advancement.

In the manufacture of composite commodity wrappers, and especially wrappers each having a transparent window strip interposed between two relatively opaque marginal portions, it is customary to form the wrappers of three simultaneously advancing ribbons of the stock, and to join the outer edges of the intervening transparent ribbon to the adjacent edges of the outer or marginal ribbons with the aid of adhesive and while the ribbons are travelling at high speed in the same direction. It is very difficult with the prior methods to insure synchronous advancement of the three ribbons, at absolutely the same speed; and unless the speed of at least the outer ribbons is absolutely synchronized, it becomes impossible to effectively attach the intermediate ribbon to the edges thereof without either producing defective attachment at one of the points, or producing a composite strip which is bulged and rough at the joined edges. It is also desirable to be able to produce the outer ribbons for such composite wrapper stock from a single roll of ribbon material, in order to readily insure synchronous travel of the outer strips during final formation of the composite ribbon, and none of the prior processes of producing such composite wrapper stock have enabled the production at high speed of effectively joined smooth composite ribbons formed of thin and relatively flexible material.

It is therefore an object of our present invention to provide an improved method of effectively synchronizing the speed of travel of several independent ribbons advancing rapidly in the same direction, the ribbons being derived either from one or from several supply rolls.

Another object of our present invention is the provision of improved apparatus for effecting commercial exploitation of the improved ribbon speed synchronizing method.

A more specific object of our invention is to provide a new and useful method of and apparatus for producing composite commodity wrapper stock comprising several adjoining strips of thin flexible material which are united as with adhesive, at their adjoining edges.

Another specific object of our invention is the provision of improved mechanism for continuously severing a single ribbon into two strips advancing longitudinally in the same direction, and for automatically spreading the strips apart laterally to any desired distance.

A further specific object of the invention is to provide improved apparatus for subjecting several simultaneously longitudinally travelling ribbons of flexible material to like tension, so that the adjacent edges thereof may be effectively joined by adhesive.

Still another specific object of the invention is the provision of simple and efficient mechanism for guiding wax coated ribbon stock along a predetermined course of travel, and for maintaining the guides free from wax deposits.

An additional specific object of our invention is to provide various improvements in the details of construction and operation of machines for handling and conveying relatively frail ribbon stock, so that the stock may be conducted at high speed and under controlled tension in any direction and location without danger of rupture.

These and other specific objects and advantages will be apparent from the following detailed description.

A clear conception of embodiments of the several steps and features constituting the present improvement, and of the mode of constructing and of operating machines built in accordance with the invention during exploitation of our improved process, may be had by referring to the drawings accompanying and forming a part of this specification wherein like reference characters designate the same or similar parts in the various views.

Figure 1:
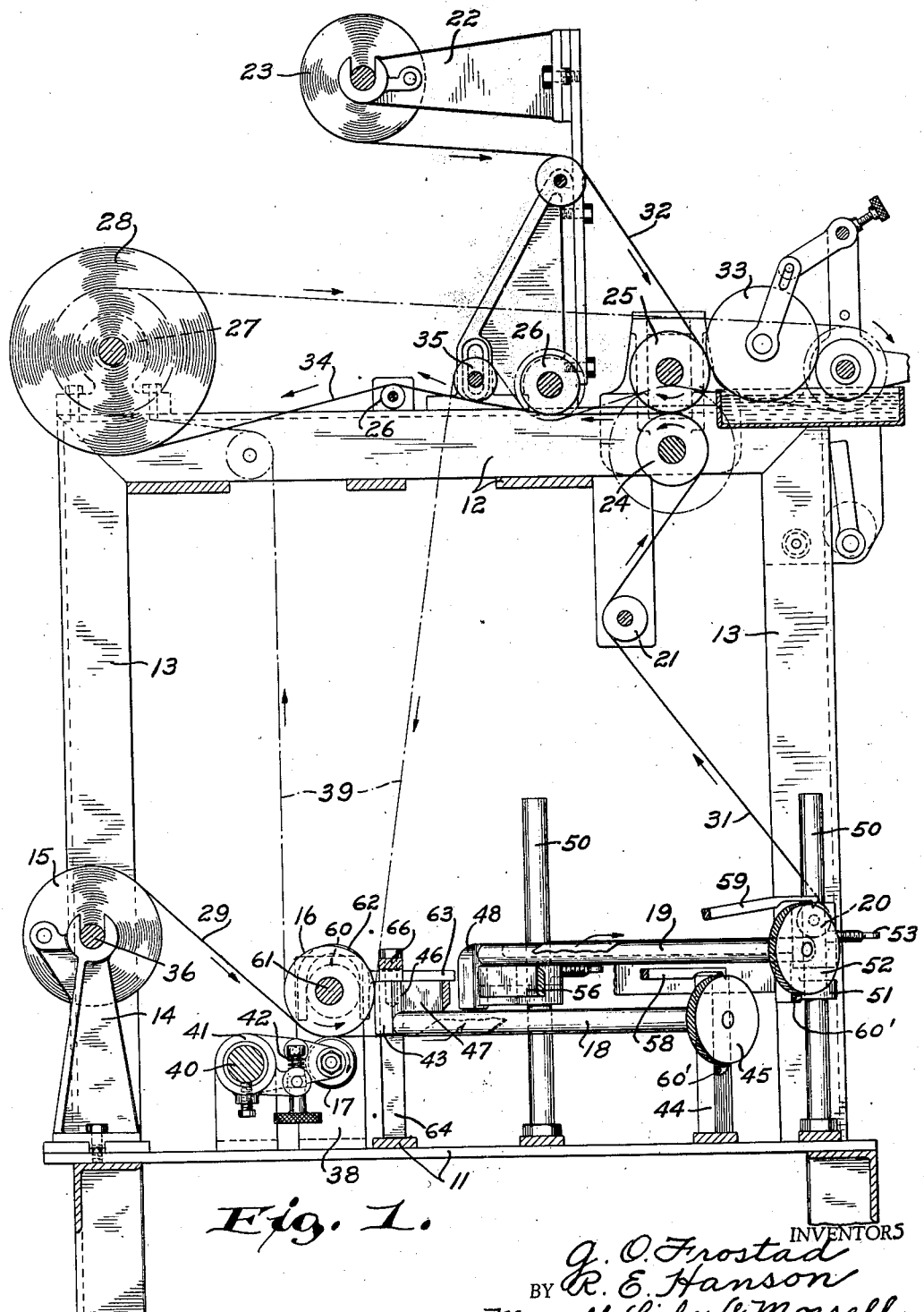
Fig. 1 is a longitudinal vertical section through a composite wrapper stock producing machine, the section being taken just inside of the frame and end bearings.

While our invention has been specifically illustrated and described herein in conjunction with a machine especially adapted for the manufacture of so-called window wrapper stock from two outer wax-coated relatively opaque ribbons joined at their inner edges by means of adhesive to the outer adjacent edges of an intervening transparent ribbon formed of cellulose film or the like, it is not the intent to thereby unnecessarily restrict the scope, since the improved method and apparatus may be utilized advantageously for many other purposes.

Referring to the drawings, the composite wrapper stock producing machine shown therein comprises in general a frame having superimposed substantially horizontal decks 11, 12 connected by corner posts 13; supporting bearings 14 for a stock supply roll 15 adjustably mounted upon the front portion of the lower deck 11; an initial guiding roller 16 and a shearing disk 17 rotatably supported upon the lower deck 11 rearwardly of the supply roll 15; lower and upper ribbon tensioning and spacing guides 18, 19 respectively arranged in sets and carried by the lower deck 11 rearwardly of the initial guiding roller 16; a final lower guide roller 20 rotatably associated with the lower deck 11 rearwardly of the upper guides 19; another ribbon guiding roller 21 rotatably suspended from the upper deck 12; supporting bearings 22 for an intermediate ribbon supply roll 23 mounted above the upper deck 12; coacting lower and upper guide and pressing rollers 24, 25 respectively, rotatably mounted upon the rear portion of the upper deck 12 near suitable adhesive applying mechanism; other guide rollers 26 rotatably supported upon the upper deck 12 forwardly of the pressing rollers 24, 25; and a set of supporting bearings 27 for the final composite wrapper stock roll 28 carried by the foremost portion of the upper deck 12.

The stock supply roll 15 may consist of a single elongated strip 29 of relatively thin and flexible material such as wax coated paper, and the shearing disk 17 cooperates with the hardened medial portion 30 of the initial roller 16 in a manner to continuously sever the strip 29 into two ribbons 31 advancing in the same direction and at the same speed, and in a substantially horizontal plane toward and in contact with the lower guides 18. The intermediate ribbon supply roll 23 may consist of a single elongated strip 32 of thin flexible transparent material such as cellulose film which after having adhesive applied to the opposite edge portions thereof by the adhesive carrier disks 33, is delivered into overlapping engagement with the inner edges of the ribbons 31 between the pressing rollers 24, 25. The composite strip or ribbon 34 thus formed by joining the outer ribbons 31 with the intermediate strip 32 is subsequently delivered past the guide rollers 26 and beneath a tensioning roll 35, to the final roll 28.

Figure 7:
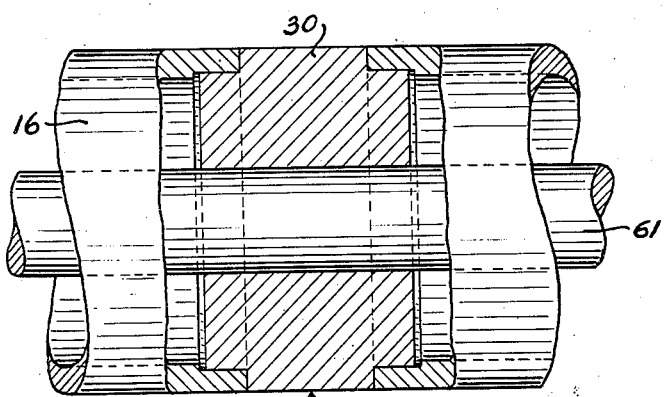
Fig. 7 is a likewise enlarged fragmentary section through the medial portion of the initial stock guiding roller and shearing disk, the section being taken along the line 7—7 of Fig. 2.

The supporting bearings 14 for the stock supply roll 15 may be made adjustable so as to accommodate rolls of various widths, and the supporting shaft 36 for the roll 15 which rests loosely within the bearings 14, is provided with well known friction mechanism 37 for frictionally restraining the rotation of the roll and to thereby maintain the strip 29 taut. The initial guiding and cutting roller 16 may be formed with the medial hardened portion applied thereto in the manner shown in Figs. 2 and 7; and this roller 16 is rotatably supported in bearings 38 and is adapted to be constantly revolved at high speed and in the direction indicated in Fig. 1, by means of chain gearing 39 shown in dot-and-dash lines. The shearing disk 17 which coacts with the strip 29 and with the lower portion of the roller 16, is rotatably supported from a pivot bearing 40 by means of an arm 41 and is pressed against the roller portion 30 by a spring 42 as clearly illustrated in Fig. 1, thereby constantly cutting the single strip 29 into two simultaneously advancing ribbons 31.

The improved tensioning and spacing assemblage comprising the lower and upper guides 18, 19 constitutes an important part of the present invention, and enable efficient commercial exploitation of our present improved process of synchronizing the speed of travel of the ribbons 31. When the ribbons 31 are formed of ordinary material devoid of coatings, the guides 18 of the lower set may be fixedly connected bars disposed at an angle relative to each other and in a common plane, and the guides 19 may likewise be fixedly connected angularly disposed bars located in a different plane from that of the bars 18 but adjustable relative thereto. In the present disclosure the spacing mechanism is especially adapted for use in connection with wax coated material, where the wax may rub off from the advancing ribbons 31 and tend to accumulate upon the guides 18, 19.

Figure 2:
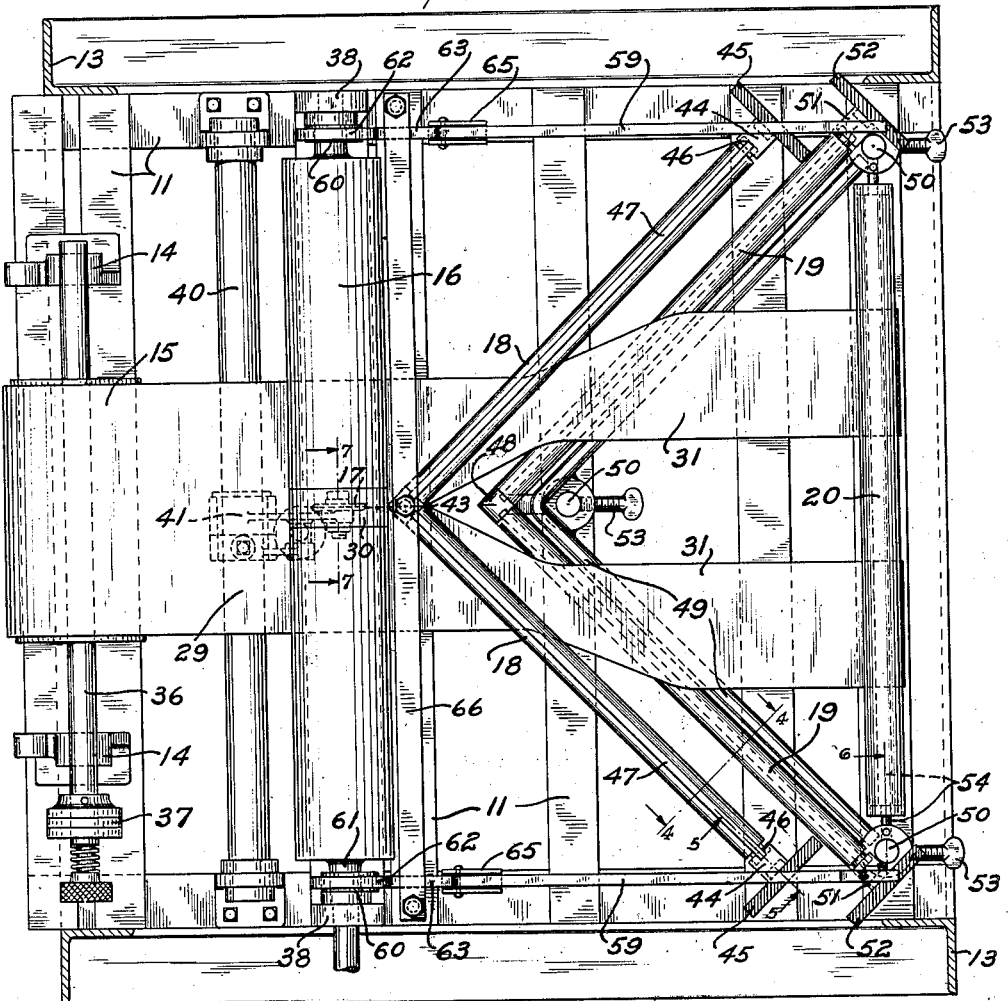
Fig. 2 is a transverse horizontal section through the machine of Fig. 1, the section being taken just above the outer ribbon forming and spacing mechanism.
Figure 4:
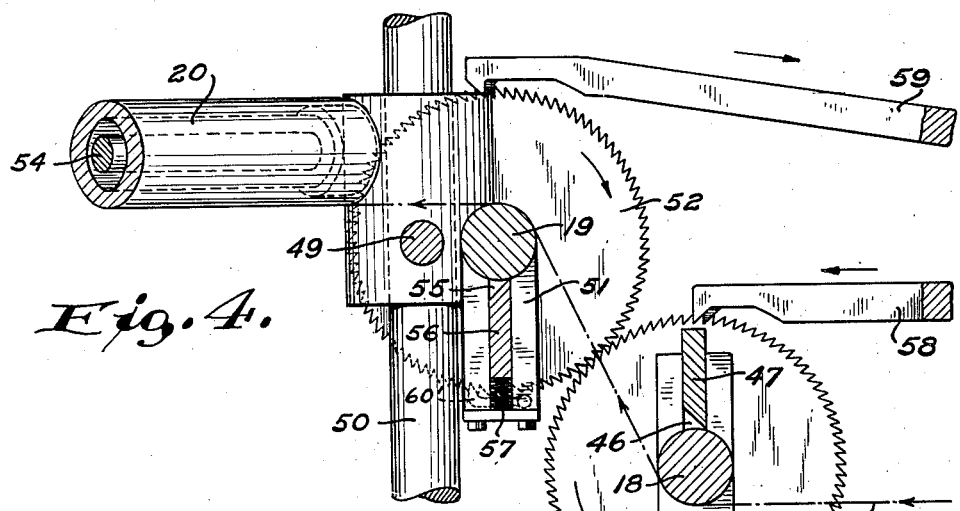
Fig. 4 is an enlarged section through one of the ribbon spacing guide assemblages, the section being taken along the line 4—4 of Fig. 2, looking outwardly.
Figure 5:
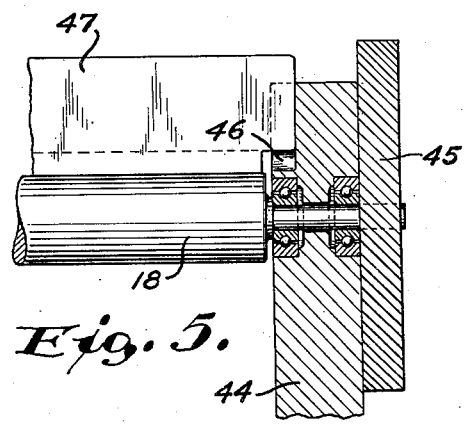
Fig. 5 is a further enlarged fragmentary section through one of the lower guide supports, the section being taken along the line 5—5 of Fig. 2.
Figure 6:
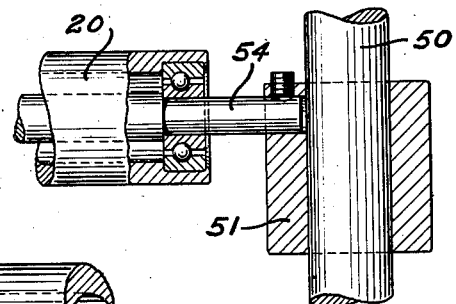
Fig. 6 is a similar fragmentary section through one of the bearings for the final guiding roller, the section being taken along the line 6—6 of Fig. 2.

The lower guides 18 are therefore formed as elongated rollers having intersecting axes lying in a common substantially horizontal plane so that the lowermost portions of the guides 18 will always lie in the tangent plane of the lowermost portion of the guide roller 16. The adjacent ends of the relatively inclined guides 18 are journalled in a depending central spreader column 43, which is suspended from its upper end and terminates directly above the ribbons 31, and the outer ends of the guides 18 are likewise journalled in square columns 44 mounted upon the lower deck 11, and have helical ratchet wheels 45 attached thereto. The fixed columns 43, 44 are provided with vertical slots 46 above the bearings of the guides 18, within which upper scraper blades 47 are slidably confined as shown in Figs. 1, 2 and 5, and the edges of these blades 47 are held in contact with the uppermost portions of the guides 18 by gravity. The upper guides 19 are also formed as elongated rollers having intersecting axes lying in a common plane which is disposed parallel to but above the plane of the guides 18, but which may be adjusted vertically so as to vary the spread of the ribbons 31. The adjacent ends of the relatively inclined guides 19 are journalled in a bracket 48 secured to the apex of an angular frame 49 which is vertically slidable along three upright columns or posts 50 carried by the lower deck 11, and the outer ends of the guides 19 are journalled in other brackets 51 secured to the outer ends of the frame 49, and are provided with helical ratchet-wheels 52 having teeth which are the reverse of those of the ratchet wheels 45, see Fig. 4. The bracket carrying frame 49 is adapted to be fixed in various positions of vertical adjustment relative to the posts 50, by means of manually manipulable locking screws 53, and the transverse guide roller 20 is journalled upon a cross-shaft 54 which firmly interconnects the outer ends of the frame 49 as indicated in Figs. 4 and 6, so that the uppermost portions of the guides 19 always lie in the lowermost tangent plane of the guide roller 20. The brackets 48, 51 have slots 55 within which lower scraper blades 56 are slidable as shown in Figs. 1 and 4, and the upper edges of the blades 56 are urged into scraping engagement with the lowest portions of the guides 19 by means of compression springs 57.

Figure 3:
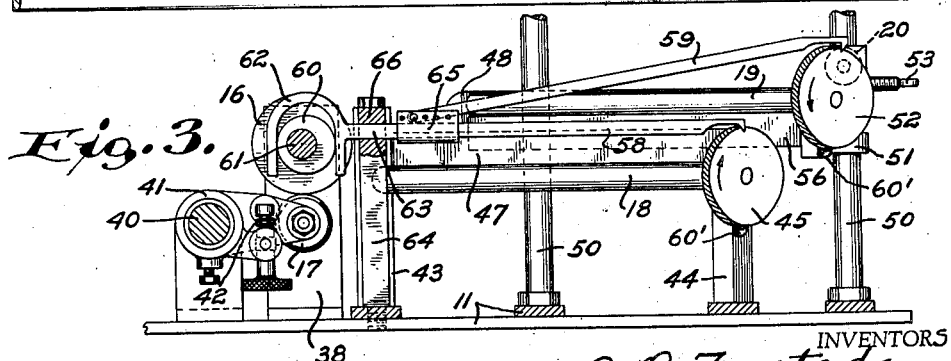
Fig. 3 is a side elevation of a portion of the outer ribbon forming and spacing mechanism, showing the gearing for intermittently revolving the ribbon guides.

The guides 18, 19 are adapted to be intermittently revolved in directions opposite to the direction of advancement of the ribbons 31 thereover, as clearly shown in Fig. 4, by means of pawls 58, 59 coacting with the teeth of the ratchet-wheels 45, 52 respectively; and reverse rotation of each of the ratchet-wheels is prevented by a gravity actuated locking pawl 60'. The pawls 58, 59 are simultaneously oscillatable or reciprocable by means of eccentrics 60 secured to the supporting shaft 61 of the initial guide roller 16 on opposite sides thereof, and coacting with U-shaped straps 62 having projections 63 which are slidable within a fixed guide frame 64, see Figs. 2 and 3. The pawls 58, 59 are attached to the projections 63 of the corresponding straps 62 by means of couplings 65, and the guide frame 64 has a normally fixed but removable transverse top-bar 66 from the center of which the central square column 43 is suspended. The assemblage is obviously such that simultaneous reciprocation of the pawls 58, 59 by the constantly revolving eccentrics 60, will cause these pawls to intermittently rotate the ratchet-wheels 45, 52 in the same directions, the ratchet-wheels 45 being rotated only during rearward travel of the pawls 58 and the other ratchet-wheels 52 being rotated only during forward movement of the pawls 59.

The rollers 21, 24, 25, 26 are of ordinary and well-known construction, the roller 25 being a resilient press roll for firmly pressing the overlapping edge portions of the ribbons 31, 32 into engagement with each other. These rollers are also adapted to be continuously revolved in proper directions by the chain gearing 39 which may be driven at high speed from any convenient source, and the adhesive applying mechanism including the disks 33 is likewise of relatively well-known construction. The disks 33 are adapted to constantly apply a thin layer of adhesive to the underside of each marginal portion of the rapidly advancing strip or ribbon 32 of transparent material, and these marginal portions are subsequently brought in contact with and are pressed against the adjacent inner edge portions of the outer ribbons 31 by the rollers 24, 25 to produce the composite strip 34. This composite strip 34 is subsequently delivered onto the final stock roll 28 in a well-known manner, and it must be apparent that synchronous speed of the component ribbons and the proper spacing thereof is essential in order to produce a smooth and durable composite final ribbon or strip.

While the normal operation of our improved machine for synchronizing the speed of travel and for properly laterally spacing the ribbons 31 by our present improved method, should be clearly apparent from the foregoing detailed description, the same will again be generally described. After the stock supply rolls 15, 23 have been properly applied and the machine is set in motion, the initial strip 29 of wax coated flexible material is constantly travelling at relatively high speed beneath and in contact with the initial roller 16, and is being severed into two similar ribbons 31 by the cutting disk 17 coacting with the roller portion 30. The ribbons 31 then travel in a substantially horizontal plane until they engage the adjoining lower portions of the lower guides 18, whereupon they are deflected upwardly and outwardly at similar oblique angles, until they engage the upper guides 19. The definitely spaced ribbons 31 thereafter travel at the same speed and in a substantially horizontal plane, until they engage the rear guide roller 20, whereupon their course is changed and they are caused to travel about the roller 21 toward the press rollers 24, 25. Here the ribbons 31 are brought into engagement with the adhesive applied to the marginal edges of the intermediate strip 32, and the composite ribbon 34 is thus produced as previously described. The composite ribbon is subsequently conducted beneath the roller 35 and is finally delivered upon the final stock roll 28 in the form of a continuous, smooth and durable triple section strip.

It is to be noted that the process of producing the composite ribbon 28 is entirely automatic and continuous, and the lateral spacing of the outer ribbons 31 is accurately performed by the two sets of inclined guides 18, 19 which are disposed in different parallel planes. The fixed distance of separation between these ribbons 31 may however be quickly and conveniently varied by merely releasing the locking screws 53 and changing the elevation of the upper guides 19 relative to the fixedly located guides 18. When the distance between the planes of the guides 18, 19 is increased, the spread or separation of the ribbons 31 is automatically increased, and vice versa; but for any predetermined relative setting of the guides 18, 19, the separation or spread of the ribbons 31 will always be constant, and the speed thereof will always be synchronous.

The knives or scrapers 47, 56 cooperating with the guides 18, 19 and with the eccentrics 60, serve to effectively remove accumulated wax and other deposits from the guides, and the pawls 45, 56 coacting with the ratchet-wheels 45, 51 function to intermittently revolve the guides 18, 19 in directions opposite to the directions of travel of the adjacent ribbons so as to produce a desirable wiping or ironing action on wax coatings of the ribbons. By virtue of the angularity of the elongated guides, it has been found that the wax which is removed from the guides 18, 19 by the scraper blades, will fall clear of the ribbons 31, leaving these ribbons free from scrapings, and the helical formation of the teeth on the ratchet-wheels 45, 51 permits convenient use of parallel reciprocating pawls 58, 59 for intermittently rotating these ratchet-wheels. The shearing disk 17 may also be readily adjusted to produce most effective severing of the advancing ribbon 29, and the assemblage has been found to consume slight additional power especially when the various bearings are of the anti-friction type as herein shown. The assemblage is moreover durable in construction and readily accessible for inspection and adjustment of parts, and the effective throw of the pawls 45, 52 may be readily altered by merely adjusting the position of the couplings 65 along the projections 63.

From the foregoing detailed description it will be apparent that the present invention provides an improved method of and apparatus for effectively synchronizing the speed and for simultaneously accurately spacing two ribbons which are constantly advancing in the same general direction. With the present improvement it is possible to utilize ribbons 31 derived from a single initial roll 15, and it is also possible to quickly vary the degree of separation of the ribbons. The improved process may be carried on with any kind of ribbon stock, and when wax or other coated stock is employed, the improved mechanism for intermittently revolving the guides 18, 19 is especially useful. The ribbons 13 besides having synchronous speed, also have equal tension, and the final product produced by our improved method is far superior to former similar products and can be produced more rapidly and with less waste.

It should be understood that it is not desired to limit this invention to the exact steps of the process or to the precise details of construction of apparatus, herein shown and described, for various modifications within the scope of the claims may occur to persons skilled in the art.

We claim:

1. In combination, a pair of elongated guide members having intersecting axes, a second pair of elongated guide members also having intersecting axes and being disposed parallel to the members of said first mentioned pair, means for rotating each of said guide members about its axis, and means for advancing two ribbons of stock in contact with and in a direction opposite to the direction of movement of the ribbon engaging portions of the complementary members of both pairs to separate said ribbons a predetermined distance.

2. In combination, a pair of elongated guide members having guiding portions disposed at an angle to each other, a second pair of elongated guide members also having guiding portions disposed at an angle and located in a plane parallel to the plane of the guiding portions of said first mentioned members, means for moving the guiding portion of each of said guide members in a predetermined direction, and means for advancing two ribbons of stock in contact with and in a direction opposite to the direction of movement of the complementary ribbon engaging guiding portions of both pairs of said members to separate said ribbons a predetermined distance.

3. In combination, a pair of relatively inclined guides disposed in a common plane, a second pair of relatively inclined guides disposed in another plane, means for moving the guiding surface of each of said guides in a predetermined direction, and means for advancing two ribbons of stock upon the guides of said first pair in the plane thereof and away from the guides of said second pair in the plane thereof, the direction of advancement of said ribbons being opposite to the direction of movement of said guiding surfaces.

4. In combination, two pairs of elongated parallel guides rotatable about axes disposed at an acute angle relative to each other, means for advancing a ribbon of stock in contact with and in a direction opposite to the direction of movement of the ribbon engaging portions of the guides of each pair to separate the ribbons a definite distance, and means for effecting variation in the distance between the guides of each pair to vary the separating distance between the ribbons upon leaving said guides.

5. In combination, a pair of elongated parallel guides, a second pair of elongated parallel guides disposed at an angle relative to said first mentioned pair, each of said guides being intermittently rotatable about its own axis and the complementary guides of said pairs lying in common planes, and means for advancing a ribbon of stock in successive contact with each of said pairs of guides to separate the ribbons a definite distance, the direction of advancement of each ribbon being opposite to the direction of movement of the ribbon engaging portion of each guide.

6. In combination, a pair of relatively inclined guides disposed in a common plane, a second pair of relatively inclined guides disposed in another plane, means for advancing two ribbons of stock upon the guides of said first pair in the plane thereof and away from the guides of said second pair in the plane thereof, means for moving the guiding surface of each guide in a direction opposite to the direction of advancement of the guided ribbon portions, and means for varying the fixed distance between said planes while said moving means remains effective.

7. In combination, a pair of relatively inclined guides having intersecting axes lying in a common plane, a second pair of relatively inclined guides having intersecting axes lying in another plane, means for advancing ribbons from one of said planes to the other in contact with said guides, and means for revolving said guides about their axes so that their ribbon engaging portions move opposite to the direction of travel of the ribbons.

8. In combination, a pair of elongated cylindrical relatively inclined guides having intersecting axes lying in a common plane, a second pair of similar relatively inclined guides also having intersecting axes lying in another plane, means for advancing ribbons from one of said planes to the other in contact with the opposite sides of the complementary guides of each pair, and means for intermittently revolving said guides about their axes.

9. In combination, two sets of relatively inclined guides disposed in off-set planes, means for advancing ribbons from one of said planes to the other in contact with the complementary guides of both sets to definitely separate the ribbons, and means for revolving said guides at speeds slower than those of the ribbons.

10. In combination, a pair of relatively inclined intermittently rotatable guides disposed in V-formation, means for feeding a single ribbon of stock centrally toward the apex of the V and for shearing the ribbon into two parts, and a second pair of relatively inclined oppositely intermittently rotatable guides subsequently cooperating with said ribbon parts to spread said parts apart a definite distance.

11. In combination, several sets of relatively inclined guides disposed in off-set planes, means for advancing ribbons from one of said planes to the other in contact with corresponding guides of said sets to separate the ribbons edgewise, means for revolving said guides about their own axes, and means for removing ribbon deposits from said revolving guides.

12. In combination, several sets of guide rollers, the rollers of each set having relatively inclined axes disposed in a common plane and the axes of the several sets lying in different planes, means for advancing several ribbons from one of said planes to the other in contact with corresponding rollers of said sets to edgewise separate the ribbons, means for rotating each of said rollers so that its ribbon engaging portion travels opposite to the direction of advancement of the contacting ribbon, and means for removing ribbon deposits from said rollers.

13. The method of guiding advancing ribbons, which comprises, causing said ribbons to advance from one plane into another parallel plane and to move edgewise away from each other intermediate said parallel planes, and subjecting the surfaces of said ribbons to a wiping action by causing the advancing surfaces thereof to contact with reversely moving guiding surfaces.

14. The method of guiding advancing ribbons, which comprises, causing said ribbons to advance from a common source in a common initial plane into another off-set plane and to move edgewise away from each other between said planes, and subjecting both surfaces of each ribbon to a wiping action by causing said surfaces to contact reversely moving guiding surfaces.

15. The method of guiding advancing ribbons, which comprises, continuously severing a single strip into component ribbons simultaneously advancing in a common initial plane, causing said ribbons to move out of said initial plane and to separate edgewise, thereafter advancing the laterally separated ribbons along another plane, and subjecting the surfaces of said ribbons to a wiping action by causing said surfaces to contact reversely moving guiding surfaces during advancement of the ribbons from one of said planes into the other.

ROY E. HANSON.
GEORGE O. FROSTAD.